(12) United States Patent
Gordon

(10) Patent No.: US 11,788,276 B2
(45) Date of Patent: Oct. 17, 2023

(54) CONSTRUCTION ATTACHMENT MEMBER

(71) Applicant: Randy Gordon, Hesperia, MI (US)

(72) Inventor: Randy Gordon, Hesperia, MI (US)

(*) Notice: Subject to any disclaimer, the term of this patent is extended or adjusted under 35 U.S.C. 154(b) by 62 days.

(21) Appl. No.: 17/399,232

(22) Filed: Aug. 11, 2021

(65) Prior Publication Data
US 2022/0049492 A1 Feb. 17, 2022

Related U.S. Application Data

(60) Provisional application No. 63/064,451, filed on Aug. 12, 2020.

(51) Int. Cl.
*E04B 2/00* (2006.01)
*E04B 1/61* (2006.01)
*F16B 5/00* (2006.01)

(52) U.S. Cl.
CPC .......... *E04B 1/6112* (2013.01); *F16B 5/0028* (2013.01); *E04F 2201/0517* (2013.01)

(58) Field of Classification Search
CPC ................. F16B 5/0028; E04F 2201/0517
See application file for complete search history.

(56) References Cited

U.S. PATENT DOCUMENTS

| | | | | |
|---|---|---|---|---|
| 1,246,585 A * | 11/1917 | Geraerdts | ............. | E04B 1/2608 52/285.3 |
| 1,905,616 A * | 4/1933 | Zanella | ................... | E04G 17/02 52/715 |
| 2,258,574 A * | 10/1941 | Leary | ...................... | E04B 2/842 52/285.3 |
| 2,567,554 A * | 9/1951 | Davey | ................... | F16B 5/0028 33/492 |
| 3,398,982 A * | 8/1968 | Venzie, Jr. | ............ | E04B 1/6112 52/489.1 |
| 3,599,385 A * | 8/1971 | LaRue | ..................... | E04F 15/04 52/471 |
| 3,998,002 A * | 12/1976 | Nathanson | ........... | A63H 33/105 446/115 |
| 4,197,945 A * | 4/1980 | Sherwood | ............ | H01R 13/447 206/706 |
| D260,481 S * | 9/1981 | Norcross | ........................ | D8/394 |
| 4,703,603 A * | 11/1987 | Hills | ..................... | F16B 5/0028 52/582.1 |
| D312,772 S * | 12/1990 | Paul | .............................. | D8/373 |
| 5,297,889 A * | 3/1994 | Crouse | ...................... | E06C 1/16 24/336 |
| 5,487,690 A * | 1/1996 | Stoffle | ................... | F16B 5/0028 52/584.1 |
| 5,520,477 A * | 5/1996 | Fink | ...................... | F16B 5/0028 403/231 |
| 5,966,893 A * | 10/1999 | Quillin | .................. | E04B 1/6108 52/285.3 |

(Continued)

*Primary Examiner* — Basil S Katcheves
(74) *Attorney, Agent, or Firm* — Dority & Manning, P.A.

(57) ABSTRACT

An attachment member is provided herein that includes a base portion configured to be positioned between a first panel and a second panel. A first side portion and a second side portion are respectively positioned on opposing sides of the base portion, the first side portion defining first and second arms and the second side portion defining third and fourth arms, wherein each of the first arm, the second arm, the third arm, and the fourth arm define a non-linear boundary.

20 Claims, 21 Drawing Sheets

(56) References Cited

U.S. PATENT DOCUMENTS

| | | | |
|---|---|---|---|
| 6,168,494 B1 * | 1/2001 | Engel | A63H 33/42 |
| | | | 446/484 |
| D474,513 S * | 5/2003 | Kichijo | D21/503 |
| 6,857,240 B1 * | 2/2005 | MacAlister | E04B 2/16 |
| | | | 52/564 |
| 7,444,792 B2 * | 11/2008 | Matson | F16B 5/0028 |
| | | | 52/285.3 |
| 7,963,392 B2 * | 6/2011 | Kodi | E04G 21/122 |
| | | | 403/396 |
| D641,805 S * | 7/2011 | Kichijo | D21/495 |
| D644,915 S * | 9/2011 | Chen | D8/354 |
| D659,522 S * | 5/2012 | Noturno | F16B 5/0028 |
| | | | D8/382 |
| 2003/0019174 A1 * | 1/2003 | Bolduc | E04F 15/04 |
| | | | 52/392 |
| 2004/0139676 A1 * | 7/2004 | Knauseder | E04F 15/04 |
| | | | 52/582.1 |
| 2006/0174579 A1 * | 8/2006 | Matson | E04D 12/00 |
| | | | 52/696 |
| 2009/0282768 A1 * | 11/2009 | Noturno | F16B 5/0028 |
| | | | 52/582.1 |
| 2011/0173921 A1 * | 7/2011 | Orchard | E04F 13/18 |
| | | | 52/712 |

\* cited by examiner

CONSTRUCTION ATTACHMENT MEMBER

CROSS-REFERENCE TO RELATED APPLICATION

This application is a non-provisional application claiming the benefit of priority under 35 U.S.C. § 119(e) to U.S. Provisional Application No. 63/064,451, filed Aug. 12, 2020, which is hereby incorporated by reference in its entirety.

FIELD OF THE INVENTION

The present disclosure generally relates to an attachment member that can be used for mounting various objects to proximately disposed structures.

BACKGROUND OF THE INVENTION

In various roofing and other construction applications, multiple sheets are aligned to create a common plane for a building. For instance, a roof of the building may include a plurality of sheathing panels. Various brackets may be used to align the sheathing panels relative to one another. However, currently available brackets are commonly misaligned when used during installation. Therefore, it is desired to design a bracket that can be used for sheathing or other applications, that may allow for easier installation.

SUMMARY OF THE INVENTION

Aspects and advantages of the disclosure will be set forth in part in the following description, or may be obvious from the description, or may be learned through practice of any of the aspects of the present disclosure.

According to some aspects of the present disclosure, an attachment member includes a base portion configured to be positioned between a first panel and a second panel. A first side portion and a second side portion are respectively positioned on opposing sides of the base portion. The first side portion defines first and second arms and the second side portion defines third and fourth arms. Each of the first arm, the second arm, the third arm, and the fourth arm define a non-linear boundary.

According to some aspects of the present disclosure, a method for installing panels is disclosed. The method includes fixing a first panel to a support structure. The method also includes positioning one or more attachment members along an edge portion of the first panel by positioning the first panel within a first insertion cavity of the one or more attachment members. In addition, the method includes positioning an edge portion of a second panel within a second insertion cavity of the one or more attachment members, wherein the edge portion of the second panel contacts a base portion of the one or more attachment members causing the attachment to rotate into an alignment position.

According to some aspects of the present disclosure, an attachment member includes a base portion configured to be positioned between a first panel and a second panel. A first side portion and a second side portion are respectively positioned on opposing sides of the base portion. The first side portion defines first and second arms and the second side portion defining third and fourth arms. A lever extends forwardly of the first and second side portions in a Z-axis direction.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, directed to one of ordinary skill in the art, is set forth in the specification, which makes reference to the appended figures, in which.

DETAILED DESCRIPTION OF THE PREFERRED EXAMPLES

Figure 1:
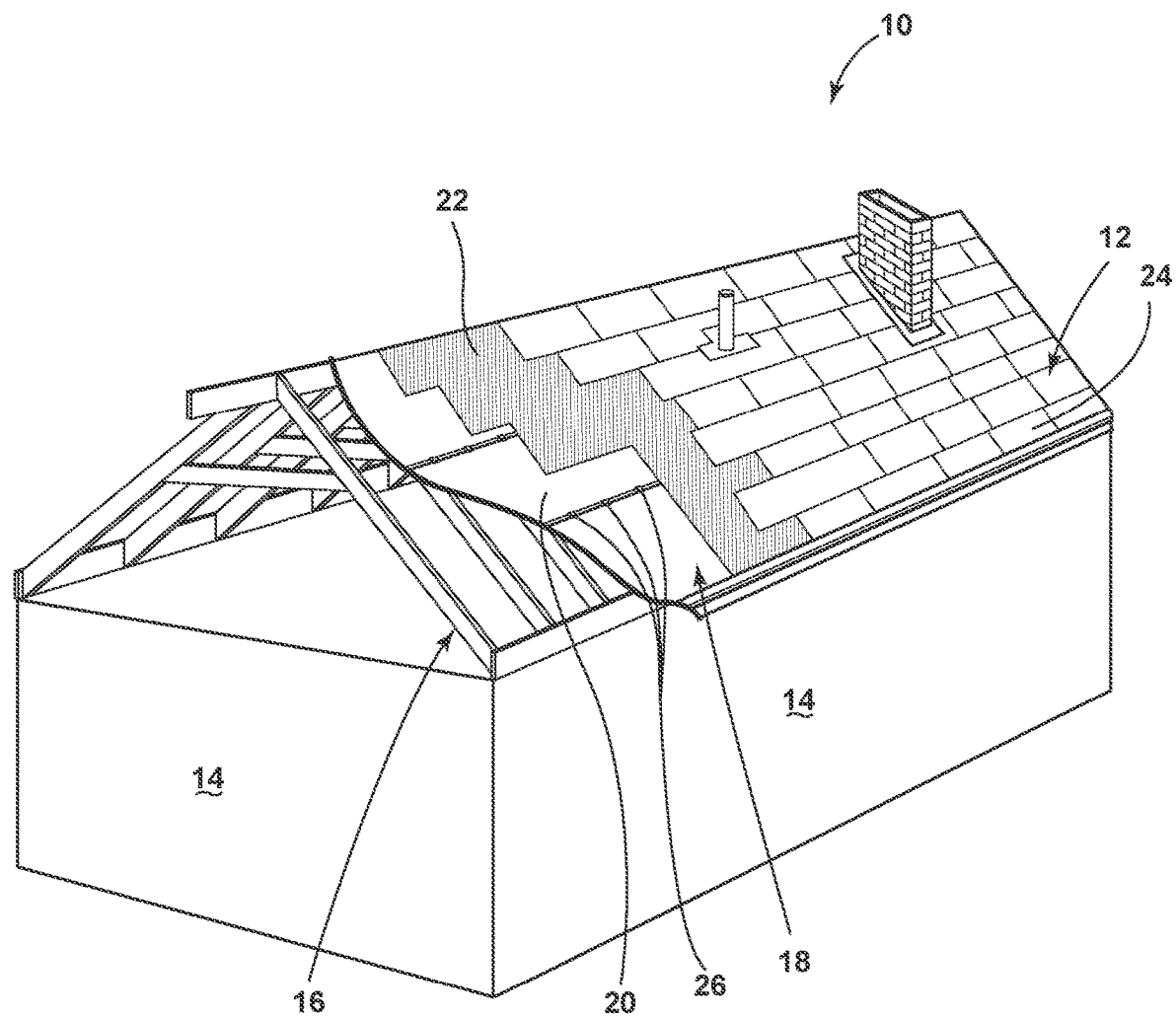
FIG. 1 illustrates an example structure with portions of a roof cut away, the structure having a shingle system according to various aspects of the present disclosure.

For purposes of description herein, the terms "upper," "lower," "right," "left," "rear," "front," "vertical," "horizontal," and derivatives thereof shall relate to the embodiment of the invention as oriented in FIG. 1. However, it is to be understood that the invention may assume various alternative orientations, except where expressly specified to the contrary. It is also to be understood that the specific devices and processes illustrated in the attached drawings, and described in the following specification are simply examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely an example of the invention that may be embodied in various and alternative forms. The figures are not necessarily to a detailed design and some schematics may be exaggerated or minimized to show a function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if any assembly or composition is described as containing components A, B, and/or C, the assembly or composition can contain A alone; B alone; C alone; A and B in combination; A and C in combination; B and C in combination; or A, B, and C in combination.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a twenty percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

For certain panel grades to be used at maximum support spacing, some building codes can require that the edge of the panels be supported either by wood blocking, tongue and groove edges, or panel brackets. The construction and building industries have used panel brackets to fulfill this requirement. The brackets are typically used to secure pieces of plywood or other panels together. Conventional brackets are small, usually metal or galvanized brackets formed in the shape of an "H" fit between the joints of two pieces of building material, such as plywood or wafer board sheets, to stiffen the joint to secure roofing materials together to allow the materials to expand and contract.

The following disclosure describes an attachment member that includes a base portion, a first side portion, and a second side portion. The first and second side portions are positioned on opposing sides of the base portion. In some instances, the first side portion defines first and second arms, which may be separated by the base portion and/or otherwise extend from the base portion. The second side portion defines third and fourth arms, which may be separated by the base portion and/or otherwise extend from the base portion.

In some instances, each of the first arm, the second arm, the third arm, and the fourth arm define a non-linear boundary. The non-linear boundary of the attachment member may allow for rotation of the attachment member as one or more panels is operably coupled with the attachment member. The rotation of the attachment member can allow for the self-alignment of the attachment member. Embodiments of the attachment member may allow for a quicker and more robust installation of multiple panels along a roof structure. The attachment member may allow for rotation during installation, which may occur due to the offset insertion of the panels relative to the attachment member and/or previously installed panels while additional panels are installed. Moreover, the effects of variances in roof pitch may be minimized through the use of the attachment member due to its self-alignment capabilities. The attachment member provided herein may be manufactured at lower costs compared to other attachment members that are only capable of a single installation process. The attachment member may be formed of a bendable sheet material, such as an anodized or other corrosion-resistant metallic material, that may be processed through various manufacturing processes, such as punching and bending. Additionally, or alternatively, the attachment member may be formed from a polymeric material, an elastomeric material, and/or any other practicable material that may be processed through processes such as injection molding, thermoforming, or any other practicable process.

Referring now to the drawings, wherein identical numerals indicate the same elements throughout the figures, FIG. 1 generally illustrates a structure 10 includes a roof 12 and exterior walls 14, wherein the roof 12 is supported by the exterior walls 14. The roof 12 is generally configured to cover an interior space bounded by walls 14 and may include an overhang that covers an exterior space external to the exterior walls 14. Furthermore, it is foreseen that the roof 12 may be a combination of flat, curved, and angled surfaces.

The roof 12 includes a support structure 16, such as pillars, internal walls, and/or cross beams or trusses. In addition, the roof 12 may additionally include an insulating material adjacent to the support structure 16 to prevent electrical contact with fasteners and thereby prevent potential eddy currents, hall voltages, and shorting a circuit.

A sheathing 18 is situated over the support structure 16 and includes one or more panels 20. The sheathing 18 can be a flat surface that extends across the dimension of the roof 12. The sheathing 18 may be formed from plywood, strand board, fiberglass, and/or any other practicable matter. The sheathing 18 may alternatively be a composite substrate.

As illustrated in FIG. 1, an underlayment material 22 is situated on top of the sheathing 18. The underlayment material 22 is a material that extends across the dimension of the roof 12 and the sheathing 18. In some instances, the underlayment material 22 may be thinner than the sheathing 18 and may be configured as felt, tar paper, spiral cut, double-laminated, and machine direction drawing (SDM) strength film, or the like.

In some instances, in the construction of a roof 12 of a building, the underlayment material 22 covers the outside surface of the one or more panels 20, and shingles 24 or other roofing material is applied over the underlayment material 22. The shingles 24 may be arranged in a pattern (i.e. overlapping) across the roof 12 of a structure 10. In this manner, traditional shingles 24 provide for protection from the environment and may have some aesthetic effect.

In some instances, when the one or panels 20 are fastened in place with each of the one or panels 20 abutting against the next panel, moisture can eventually cause expansion of the panels 20 leading to buckling along the abutting edges. Accordingly, an attachment member 26 may be used to align and/or space two adjacent panels 20 from one another. The attachment members 26 can be slid over the adjacent side edges of two sheets of plywood to expedite the alignment of each sheet relative to one another to obtain the necessary spacing.

Figure 2:
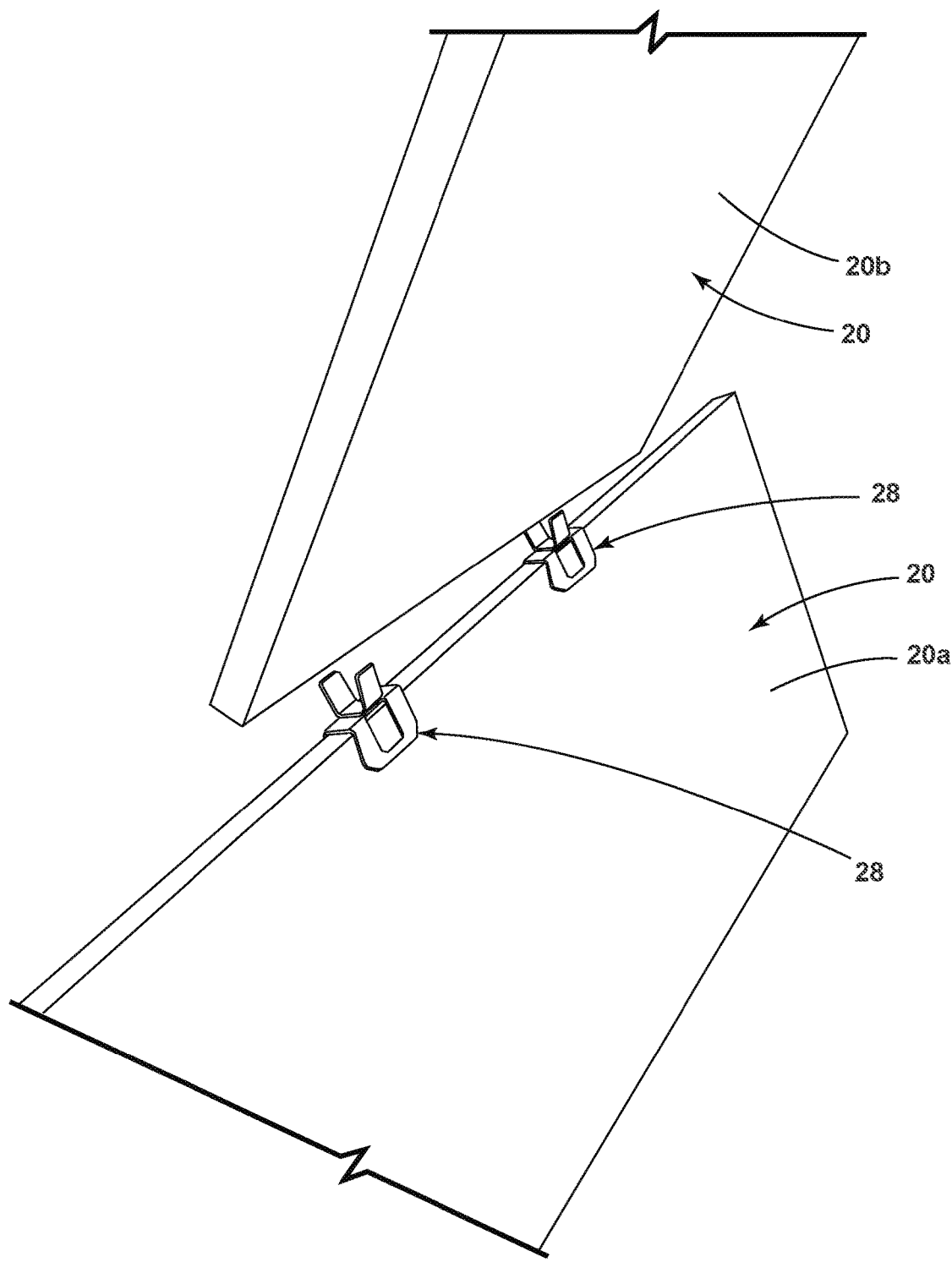
FIG. 2 is a side perspective view of a conventional bracket positioned between first and second panels.
Figure 3:
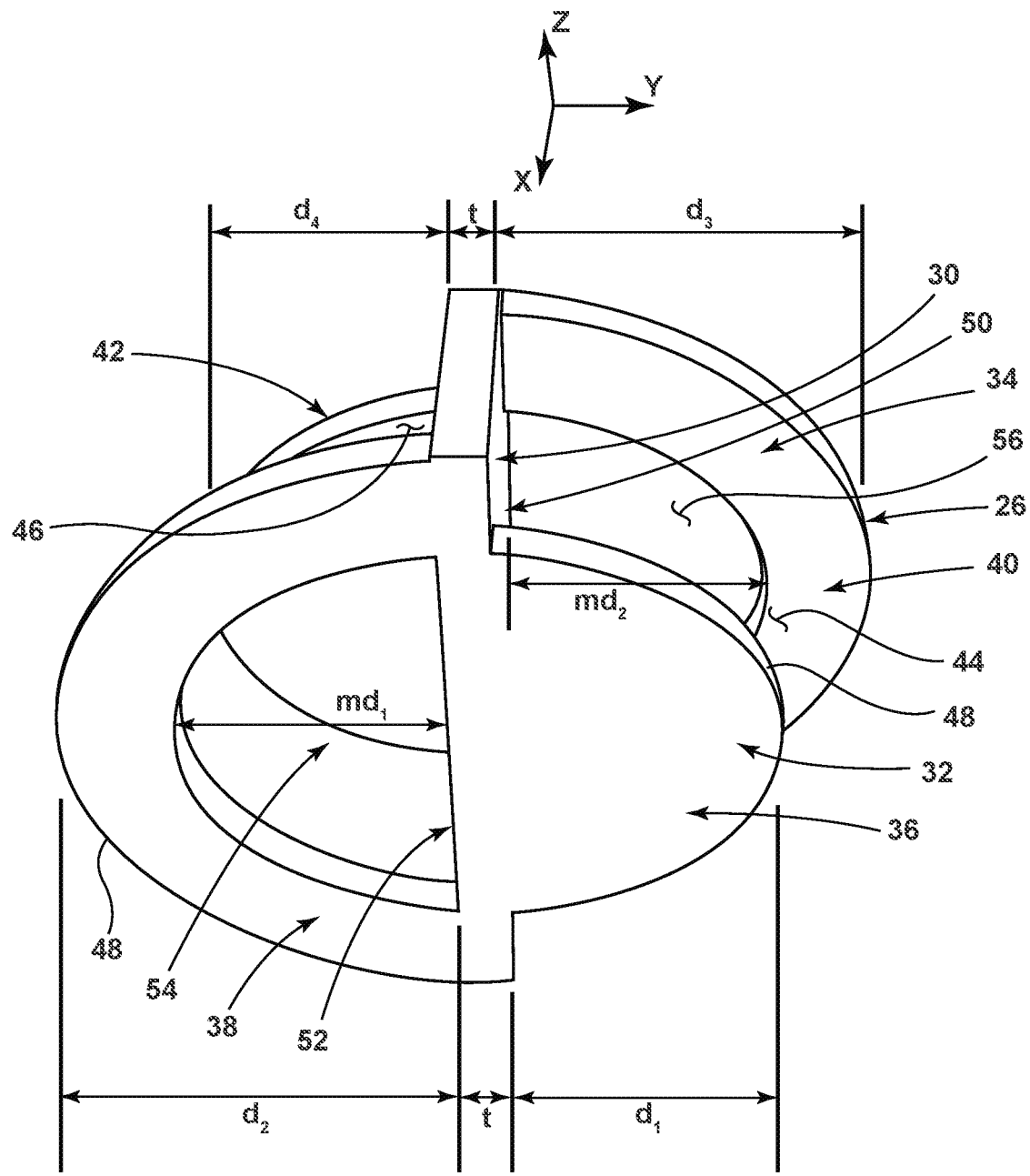
FIG. 3 is a side perspective view of an attachment member that may be positioned between first and second panels according to various aspects of the present disclosure.
Figure 4:
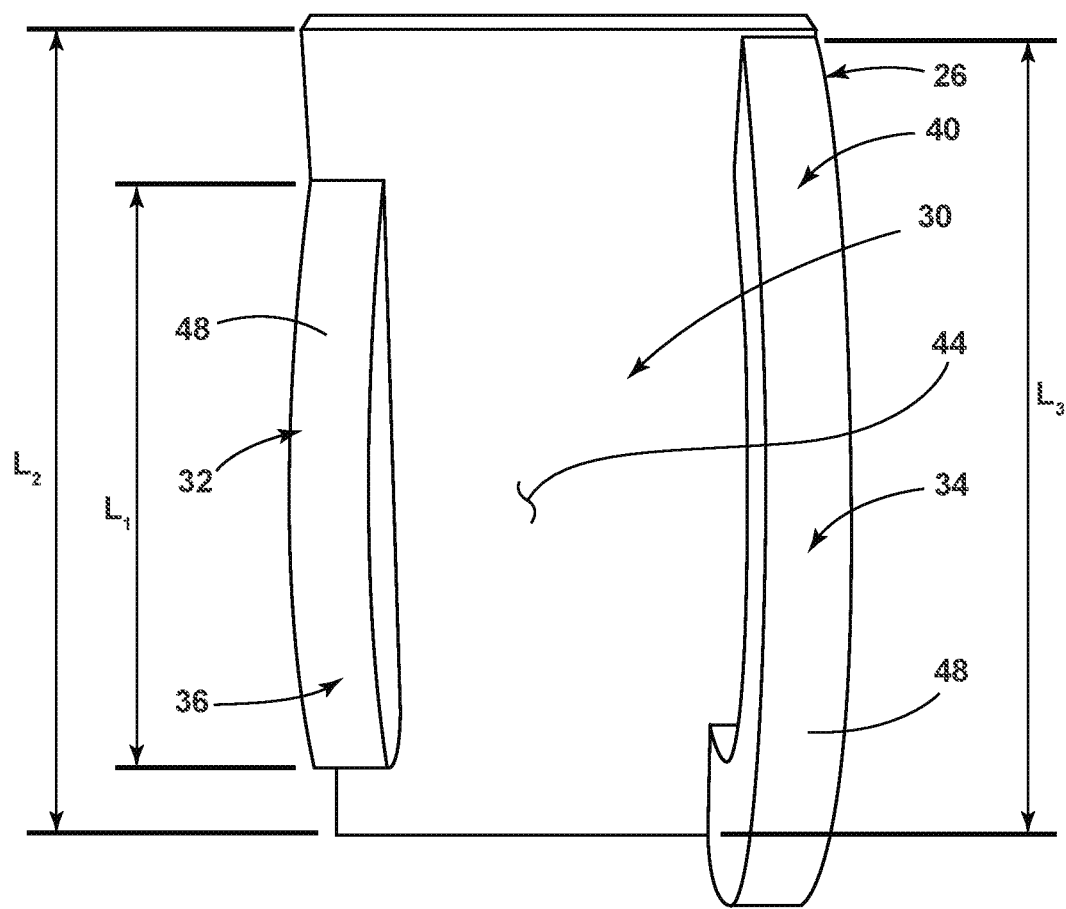
FIG. 4 is a top perspective view of the attachment member according to various aspects of the present disclosure.
Figure 5:
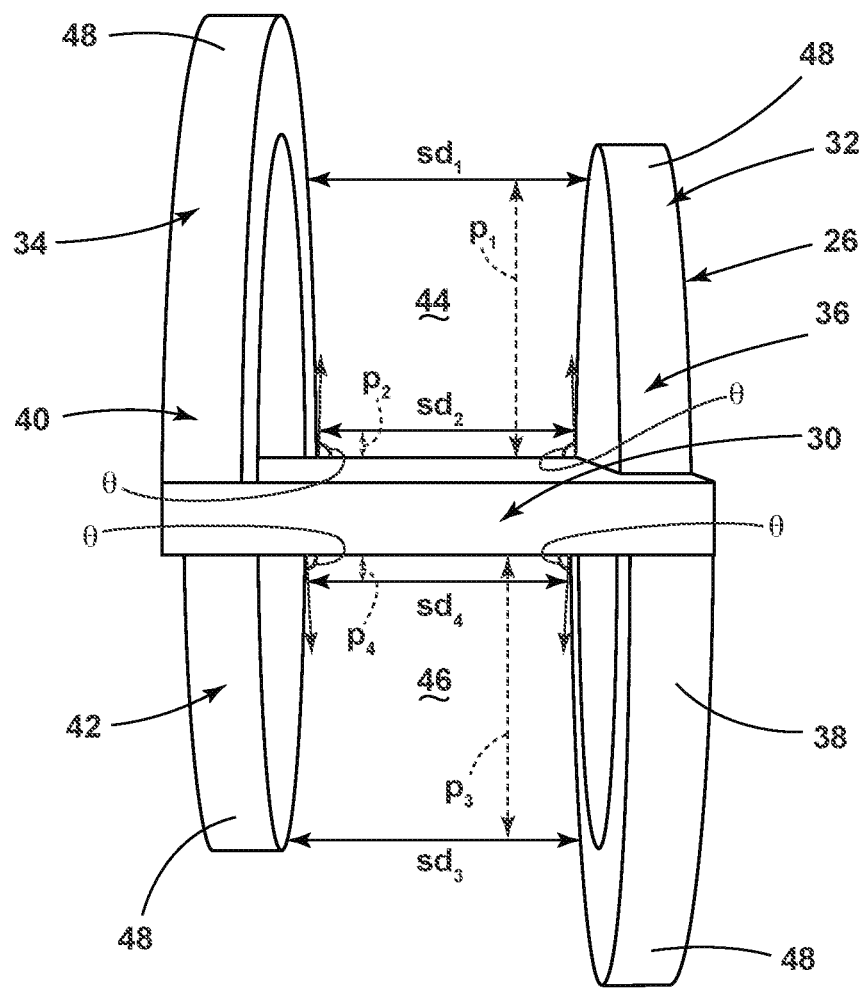
FIG. 5 is a front perspective view of the attachment member according to various aspects of the present disclosure.
Figure 6:
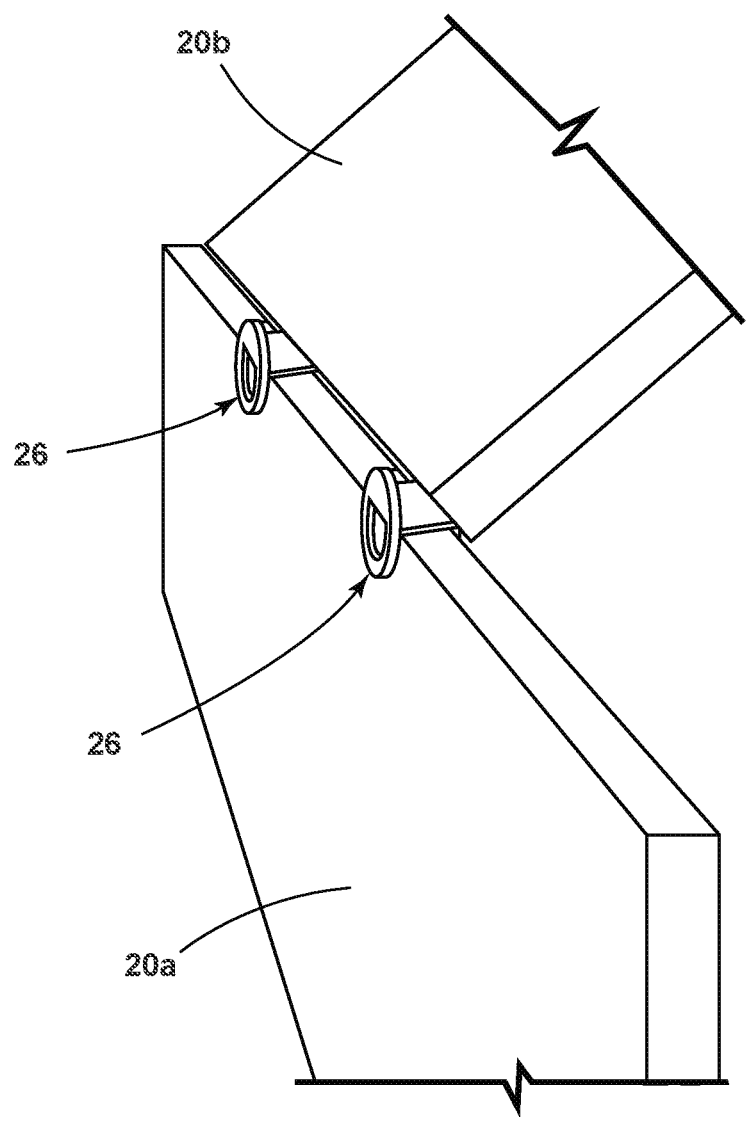
FIG. 6 is a side perspective view of the attachment member operably coupled with a first panel according to various aspects of the present disclosure.
Figure 7:
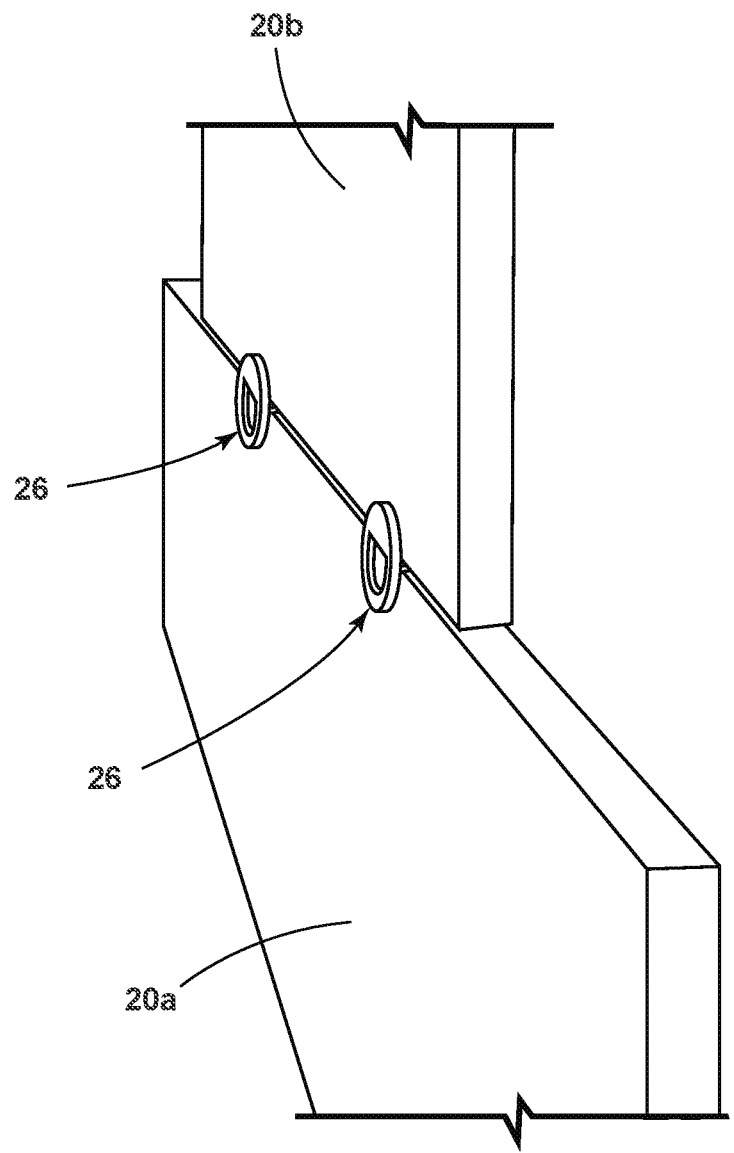
FIG. 7 is a side perspective view of the attachment member operably coupled with first and second panels according to various aspects of the present disclosure.
Figure 8:
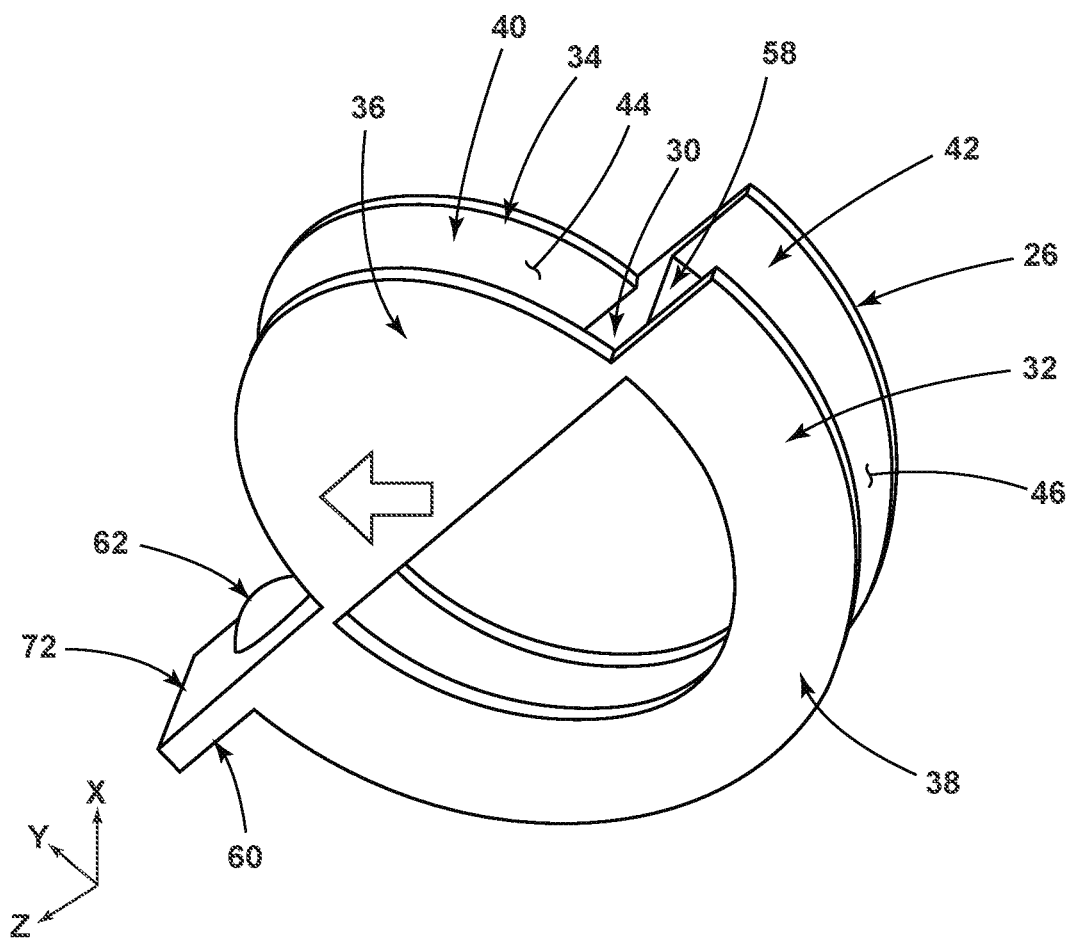
FIG. 8 is a side perspective view of the attachment member according to various aspects of the present disclosure.
Figure 9:
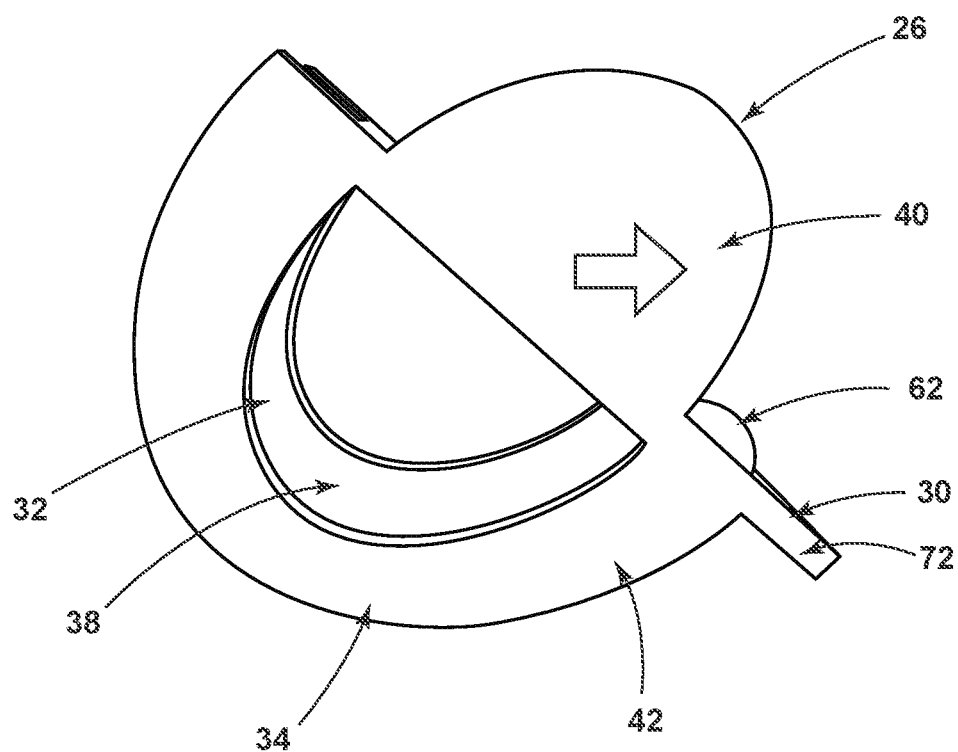
FIG. 9 is a perspective view of the attachment member according to various aspects of the present disclosure.
Figure 10:
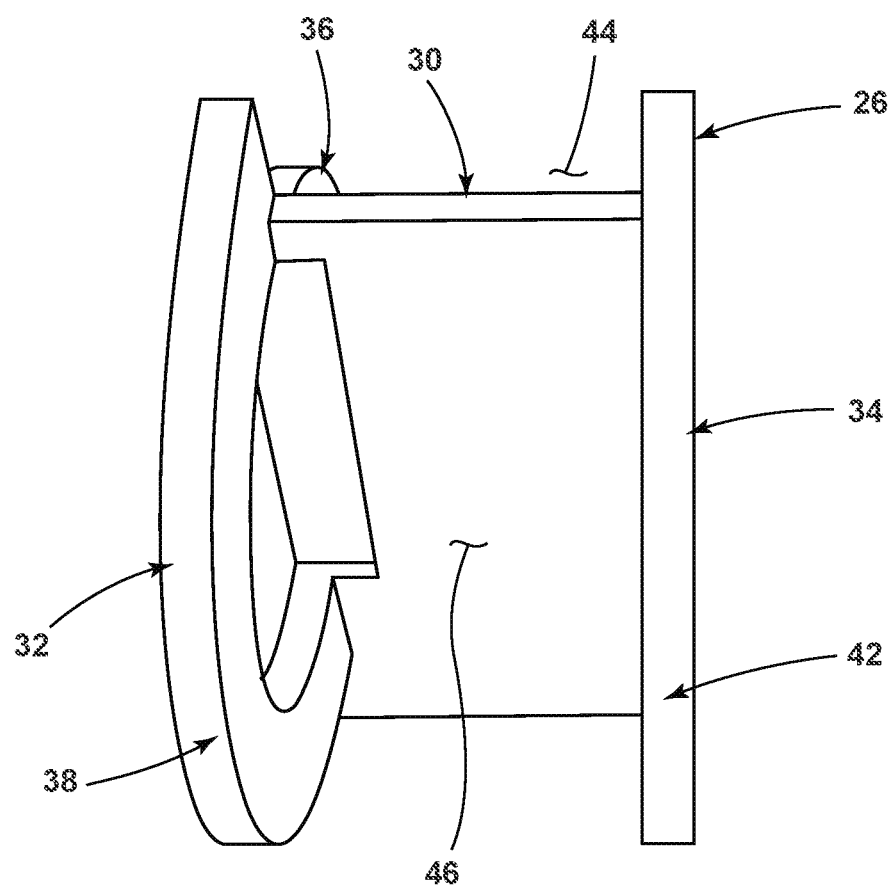
FIG. 10 is a bottom perspective view of the attachment member according to various aspects of the present disclosure.
Figure 11:
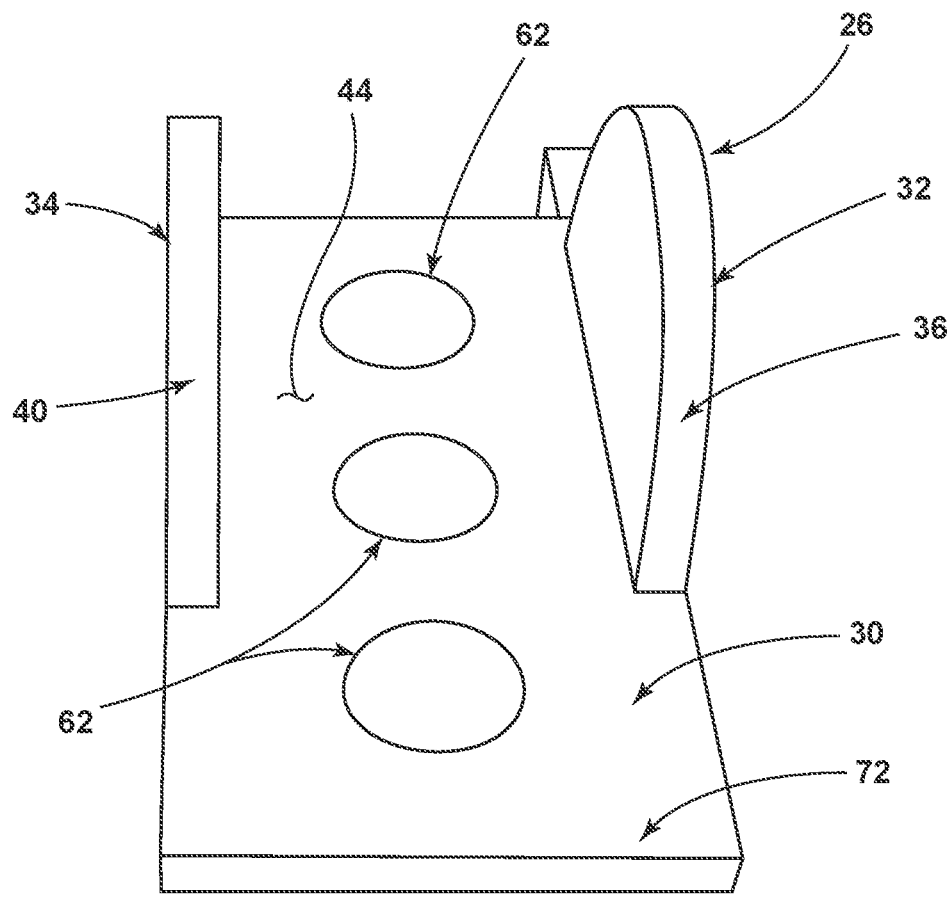
FIG. 11 is a top perspective view of the attachment member according to various aspects of the present disclosure.

As illustrated in FIG. 2, conventional brackets 28 may be placed between one or more panels 20a, 20b that may have a general I-shaped structure in which the bracket 28 includes a middle portion and a pair of generally rectangular extension portions extending in opposing directions from the middle portion. Each of the extension portions includes first and second planar portions that are to be positioned on opposing sides of the one or more panels 20a, 20b. However, during installation, the conventional bracket 28 may not allow for deviations in installation angle and/or allow for width variances between the one or more panels 20a, 20b. As such, the use of the conventional bracket 28 may be tedious, difficult, and cause unnecessary health issues as the panels 20a, 20b are installed on a roof 12 of a structure 10.

Conversely, as illustrated in FIGS. 3-21, the attachment member 26 provided herein may allow for rotation of the attachment member 26 as one or more panels 20a, 20b is operably coupled with the attachment member 26. The rotation of the attachment member 26 can allow for self-alignment of the attachment member 26 such that the panels 20a, 20b may be installed in a more efficient, more consistent, and/or safer manner.

As shown in the examples illustrated in FIGS. 3-7, the attachment member 26 may include a base portion 30, a first side portion 32, and a second side portion 34 on an opposite side of the base portion 30 from the first side portion 32. In some instances, the first side portion 32 may include first and second arms 36, 38 that extend in generally opposing directions from one another to form the first side portion 32. Likewise, the second side portion 34 may include third and fourth arms 40, 42 that extend in generally opposing directions from the base portion 30 to form the second side portion 34.

A first insertion cavity 44 may be defined between the base portion 30, the first arm 36, and the third arm 40 that is configured to house a portion of a first panel 20a and a second insertion cavity 46 may be defined between the base portion 30, the second arm 38, and the fourth arm 42 that is configured to house a portion of a second panel 20b. Moreover, the base portion 30 may have a defined width to provide a desired offset between the first and second panels 20a, 20b. For instance, the American Plywood Association has provided that a standard offset of one-quarter inches between the side edges of adjacent panels 20a, 20b can be implemented. Thus, in some instances, the base portion 30 may have a thickness of one-quarter inches. However, in other examples, the base portion 30 may have any other practicable thickness without departing from the teachings provided herein.

With further reference to FIGS. 3-7, in some examples, each of the first arm 36, the second arm 38, the third arm 40, and the fourth arm 42 define a non-linear boundary 48. For example, the first arm 36, the second arm 38, the third arm 40, and the fourth arm 42 may each have a generally rounded, semi-circular, or any other practicable shape which may allow for easier insertion of a panel 20 into each of the first and second insertion cavities.

In some instances, the first arm 36 may extend a first distance $d_1$ from a top surface 50 of the base portion 30, and the second arm 38 may extend a second distance $d_2$ from a bottom surface 52 of the base portion 30. In some examples, the second distance $d_2$ may be greater than the first distance $d_1$. However, it will be appreciated that the second distance $d_2$ may be generally equal to or less than the first distance $d_1$ without departing from the scope of the present disclosure.

Further, the second arm 38 may define a first aperture 54 therein. The first aperture 54 may be generally semicircular and define a thickness of the first arm 36. The first aperture 54 can have a first maximum aperture distance $md_1$. In some instances, the first maximum aperture distance $md_1$ can be greater than the first distance $d_1$, which is defined as the distance between the first arm 36 from a top surface 50 of the base portion 30. In some instances, the first aperture 54 may assist in allowing flexing of the first arm 36 to assist in accepting panels 20 of various thicknesses.

Similarly, the third arm 40 may extend a third distance $d_3$ from the top surface 50 the base portion 30, and the fourth arm 42 may extend a fourth distance $d_4$ from the bottom surface 52 of the base portion 30. In some examples, the third distance $d_3$ may be greater than the fourth distance $d_4$, which is defined as the distance between the fourth arm 42 the bottom surface 52 of the base portion 30. Moreover, the second and third distances $d_2$, $d_3$ may be generally equal. The second and third distances $d_2$, $d_3$ may also be generally equal. However, it will be appreciated that the second distance $d_2$ may be generally equal to or less than the first distance $d_1$ without departing from the scope of the present disclosure.

Further, the third arm 40 may define a second aperture 56 therein. The second aperture 56 may be generally semicircular and define a thickness of the third arm 40. The second aperture 56 can have a second maximum aperture distance $md_2$ wherein the second maximum aperture distance $md_2$ is greater than the second distance $d_2$. In some instances, the second aperture 56 may assist in allowing flexing of the third arm 40 to assist in accepting panels 20a, 20b of various thicknesses.

Each of the first arm 36, the second arm 38, the third arm 40, and the fourth arm 42 may extend at a defined angle θ from the base portion 30, which may be between 75 and 105 degrees, non-perpendicular, or any other practicable angle. In some instances, a first separation distance $sd_1$ between the first and third arms 36, 40 at a first position $P_1$ from the top surface 50 of the base portion 30 may be greater than a second separation distance $sd_2$ between the first and second arms 36, 38 at a second position $P_2$ that is between the first position $P_1$ and the top surface 50 of the base portion 30. However, it will be appreciated that the first and second separation distances $sd_1$, $sd_2$ may be generally equal or that the second separation distance $sd_2$ is greater than the first separation distance $sd_1$. Likewise, a third separation distance $sd_3$ between the second and fourth arms 38, 42 at a third position $P_3$ from the bottom surface 52 of the base portion 30 may be greater than a fourth separation distance $sd_4$ between the third and fourth arms 40, 42 at a fourth position $P_4$ positioned between the third position $P_3$ and the bottom surface 52 of the base portion 30. However, it will be appreciated that the third and fourth separation distances $sd_3$, $sd_4$ may also be generally equal or that the fourth separation distance $sd_4$ is greater than the third separation distance $sd_3$.

In various examples, the attachment member 26 may be formed from any practicable material, such as a polymeric material, a metallic material, a composite material, an elastomeric material, a combination thereof, and/or any other practicable material. In some instances, the attachment member 26 may be formed through multiple manufacturing steps, such as by stamping and bending a metallic material to form the attachment member 26. In such instances, a metallic material may be stamped and the first through the fourth arms 36, 38, 40, 42 may be bent away from the base portion 30 to form the attachment member 26. Further, in some examples, prior to bending, the third arm 40 may be positioned within the first arm 36 and the second arm 38 may be positioned within the fourth arm 42. However, it will be appreciated that any practicable manufacturing process employing any number of steps may be used to form the attachment member 26 provided herein.

With further reference to FIGS. 3-7, in some cases, the base portion 30 may extend outwardly of the one or more arms 36, 38, 40, 42. For instance, the first arm 36 and the fourth arm 42 may have a length $L_1$ proximate to the base portion 30 that is less than a length $L_2$ of the base portion 30. For instance, as illustrated in FIGS. 3-7, the first and fourth arms 36, 42 may have a length $L_1$ proximate to opposing surfaces of the base portion 30 that is less than the length $L_2$ of the base portion 30. Further, the second and third arms 38, 40 may have a length $L_3$ that is generally equal to the length $L_2$ of the base portion 30.

In the examples illustrated in FIGS. 8-11, the attachment member 26 may include a first arm 36, a second arm 38, a third arm 40, and a fourth arm 42 that each extends from a base portion 30 in the Y-axis direction. In some instances, the first and the third arms 36, 40 may extend from a first side portion 32 of the base portion 30 and the second arm 38 and/or the fourth arm 42 extend from a second side portion 34 of the base portion 30. In some examples, the first and the third arms 36, 40 may extend rearwardly in the Z-axis direction of a first end portion 58 of the base portion 30 with the first end portion 58 extending rearwardly of the second arm 38 and the fourth arm 42. Additionally, the base portion 30 may extend forwardly in the Z-axis direction of each of the first arm 36, the second arm 38, the third arm 40, and the fourth arm 42 on an opposing second end portion 60 of the base portion 30 thereby forming a lever 72 that can be positioned outwardly of at least one of the first and second side portions 32, 34.

In the illustrated examples, the first and the third arms 36, 40 may respectively define first and second apertures 54, 56. As provided herein, the first and second apertures 54, 56 may have a geometrical shape that is generally similar to an outer boundary 48 of the second arm 38 and the fourth arm 42.

As illustrated in FIGS. 8-11, a top surface 50 and/or a bottom surface 52 of the base portion 30 may define or include contact buttons 62 that extend away from the top surface 50 and/or the bottom surface 52. For instance, as illustrated in the examples shown in FIGS. 8-11, the top surface 50 of the base portion 30 may include a plurality of contact buttons 62 that allow for an edge of a panel 20 to contact each button 62. In such instances, the base portion 30 may be formed with a standard thickness with the buttons 62 having variable heights that allow for various offsets between the first and second panels 20a, 20b.

Figure 12:
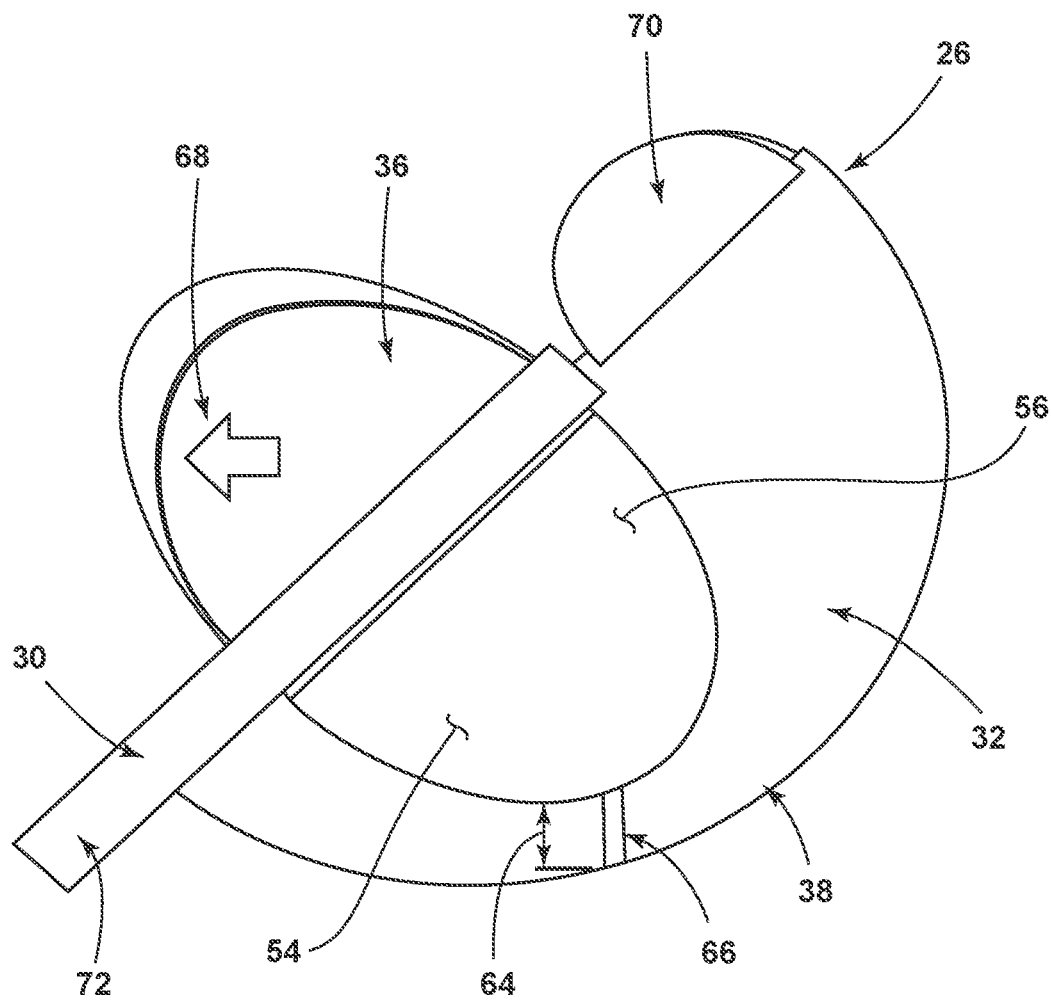
FIG. 12 is a side perspective view of the attachment member according to various aspects of the present disclosure.
Figure 13:
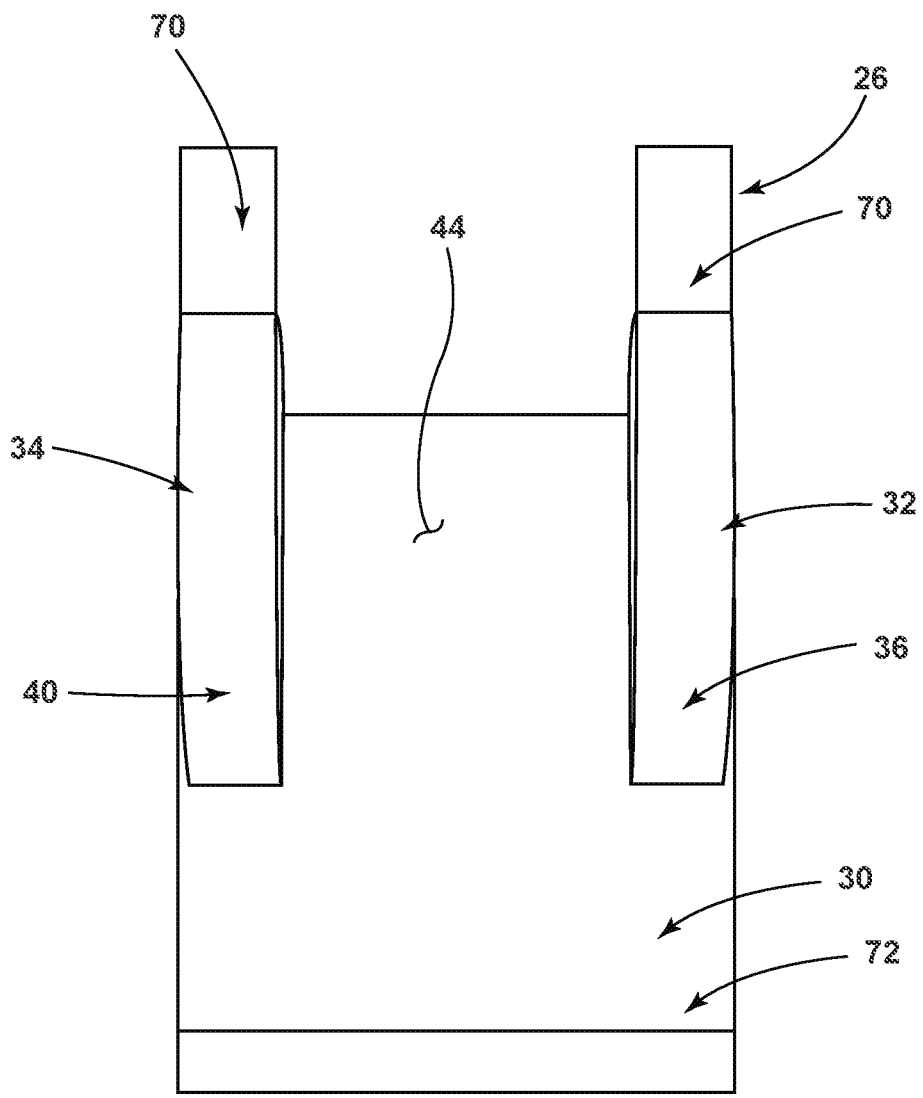
FIG. 13 is a top perspective view of the attachment member according to various aspects of the present disclosure.
Figure 14:
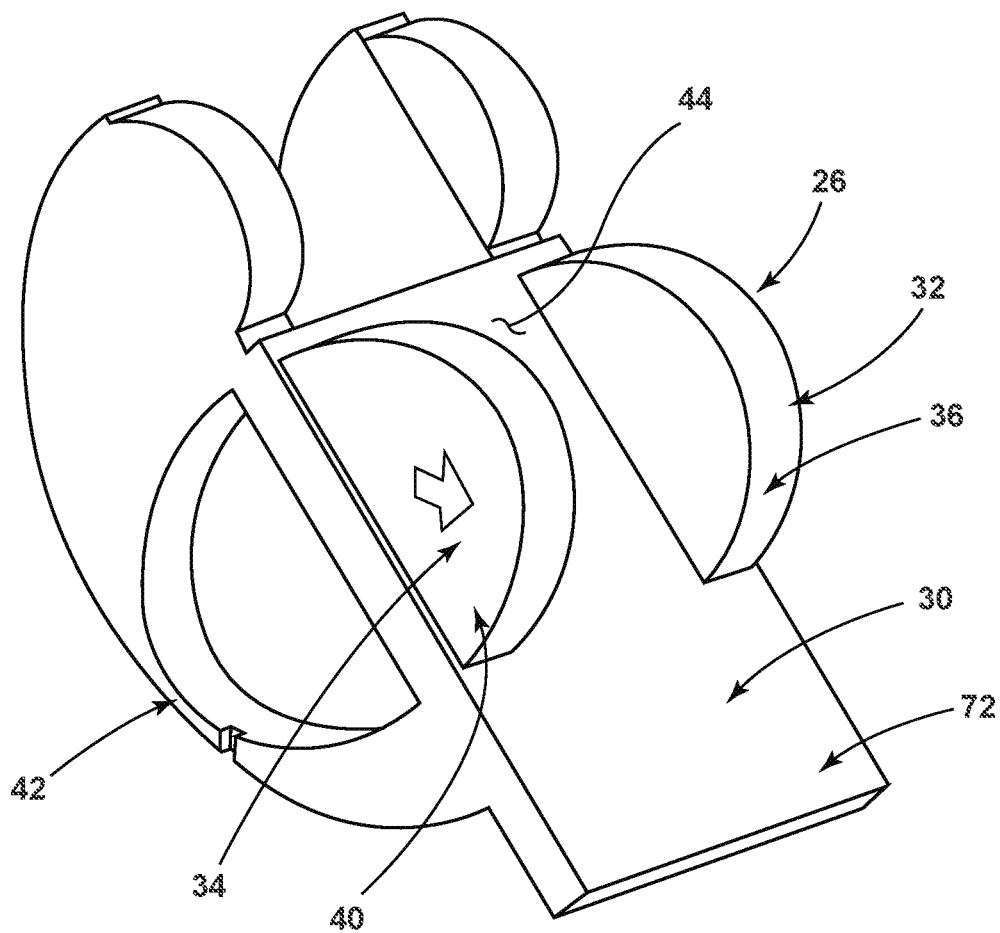
FIG. 14 is a side perspective view of the attachment member according to various aspects of the present disclosure.

With reference to FIGS. 12-14, in some examples, the first arm 36 and the third arm 40 may be generally positioned on a first side of the base portion 30 while the second arm 38 and the fourth arm 42 may be generally positioned on an opposing side of the base portion 30. As illustrated, the first arm 36 and the third arm 40 may define respective apertures 54, 56, which may each have an ellipsoidal shape. Likewise, an outer boundary 48 of the second arm 38 and the fourth arm 42 may be ellipsoidal having an inconsistent radius, or any other practicable shape. In some instances, the thickness 64 of the second arm 38 and the fourth arm 42 may be varied therealong.

As described above, the base portion 30 may be offset from the first arm 36, the second arm 38, the third arm 40, and/or the fourth arm 42. For example, as illustrated in FIGS. 12-14, the first arm 36 and the third arm 40 may extend rearwardly of the first end portion 58 of the base portion 30. Conversely, the base portion 30 may extend forwardly in the Z-axis direction of the first and third arms 36, 40 on an opposing second end portion 60. Further, the second arm 38 and the fourth arm 42 may both be positioned such that the base portion 30 extends both forwardly in the Z-axis direction and rearwardly in the Z-axis direction of the base portion 30.

In some instances, one or more of the arms 36, 38, 40, 42 may include an indicator 66 thereon. In operation, the indicator 66 may be set to a generally parallel position with a first panel 20a, which puts a lever 72 at an approximate 45 angle to the panel edge, when a first panel 20a is positioned within a first insertion cavity 44. As an additional sheet is positioned within the second insertion cavity 46, the lever 72 of the attachment member 26 is contacted by the second panel 20b and thereby rotates the attachment member 26 to a set position. When the attachment member 26 is appropriately installed, an indicia 68 may be configured to be oriented in a predefined direction.

Moreover, in some instances, various arms 36, 38, 40, 42, such as the first arm 36 and the third arm 40 may include extensions 70 on a bottom portion of each respective arm 36, 40, when the arm 36, 40 extends outwardly of the base portion 30. In some examples, the extensions 70 may be rounded or any other shape. In operation, the second arm 38, the fourth arm 42, and the extensions 70 may define the second insertion cavity 46 and align the second panel 20b therein.

Figure 15:
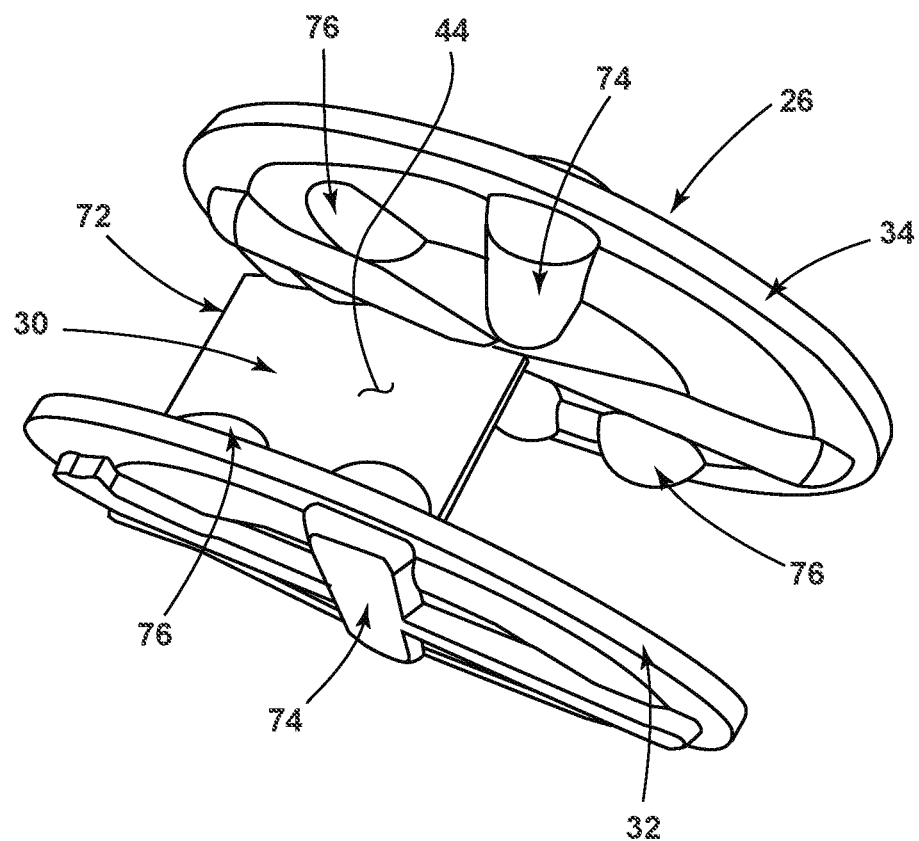
FIG. 15 is a top perspective view of the attachment member according to various aspects of the present disclosure.
Figure 16:
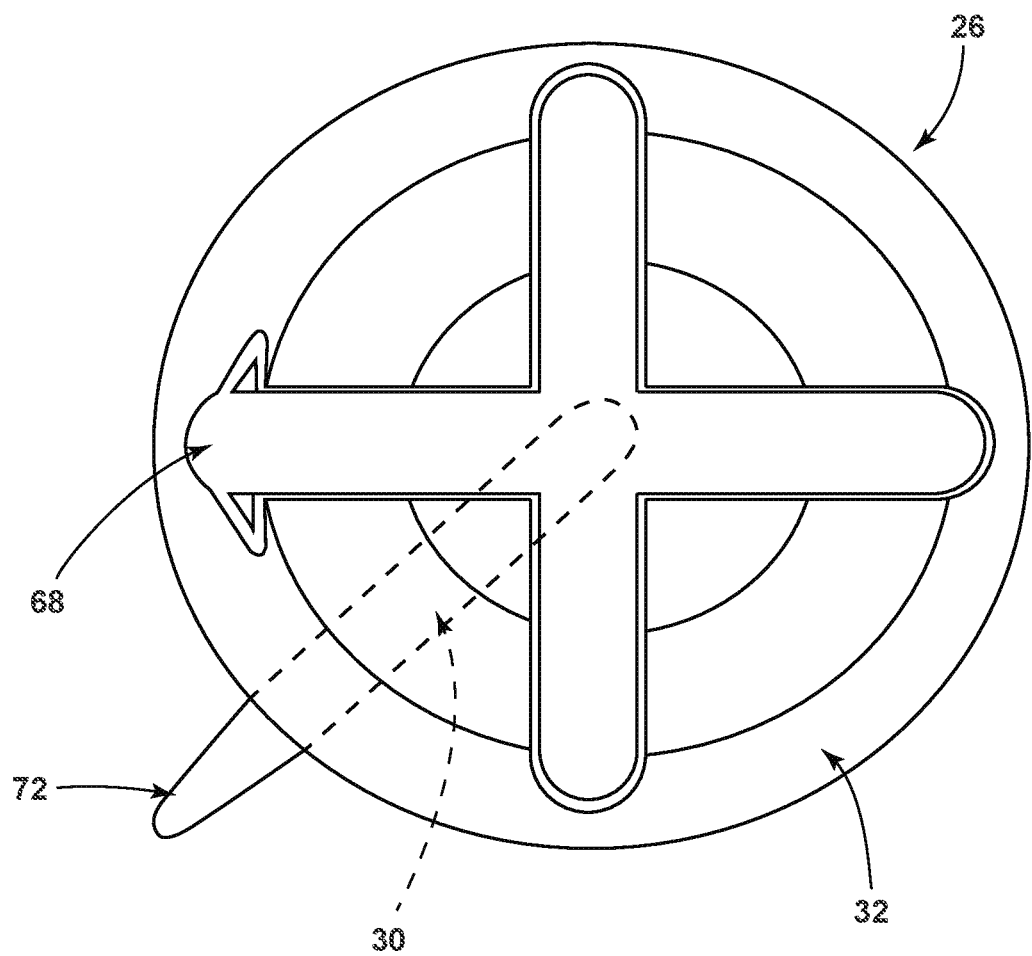
FIG. 16 is a side perspective view of the attachment member according to various aspects of the present disclosure.
Figure 17:
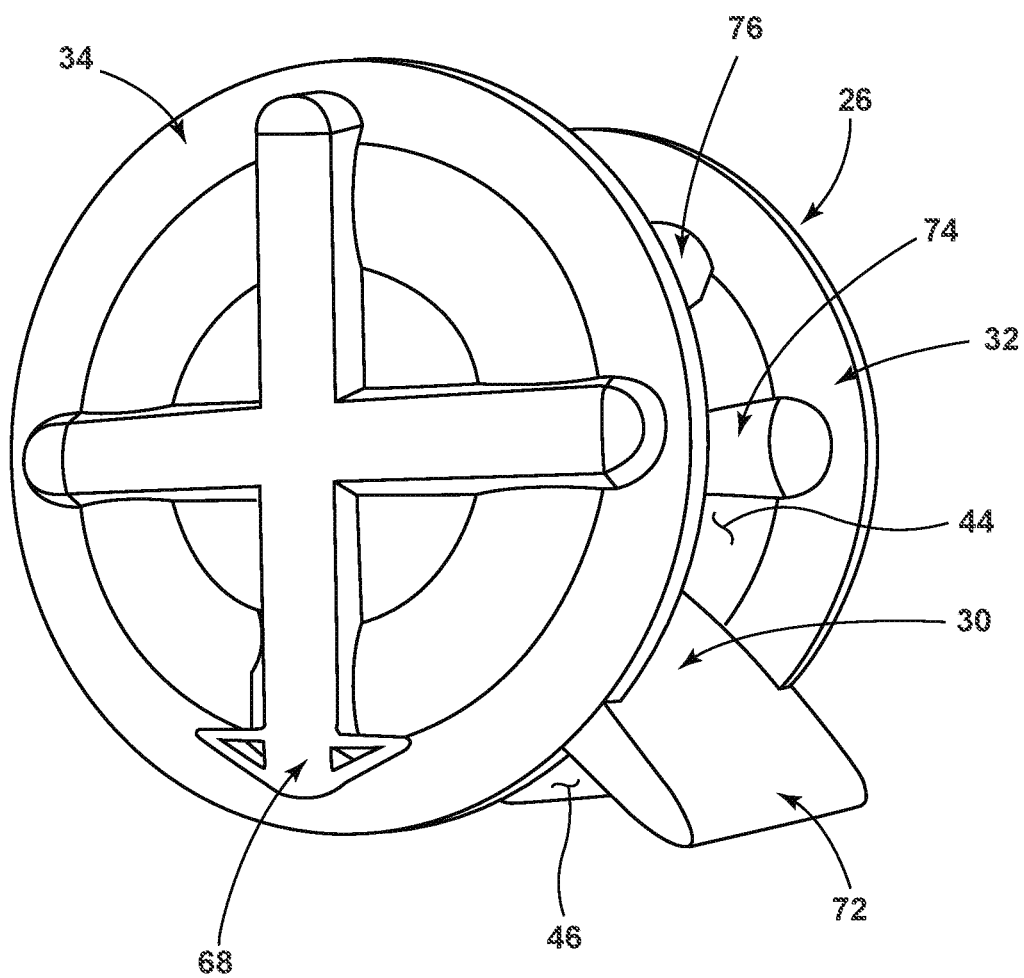
FIG. 17 is a side perspective view of the attachment member according to various aspects of the present disclosure.

In some examples, such as those illustrated in FIGS. 15-17, as provided herein, the base portion 30 may extend outwardly of the first and second side portions 32, 34. Accordingly, the base portion 30 may form a lever 72 that is positioned outwardly of at least one of the first and second side portions 32, 34. The lever 72, in some instances, may have a chamfered end portion, as illustrated in 17 and 18, a curved end portion, or an end portion of any other practicable shape.

With further reference to FIGS. 15-17, in some instances, one or both of the side portions 32, 34 may include one or more features for further assisting an installer of the one or more panels 20a, 20b. For instance, one or both of the side portions 32, 34 may include indicia 68 thereon that indicates a predefined direction of orientation for the attachment member 26 or a suggested initial position of the attachment member 26 relative to an edge of the first panel 20a. For example, one or both of the side portions 32, 34 may include an arrow that extends in an offset direction from the base portion 30 and/or the lever 72. In such instances, the indicia 68 may provide an alignment line that is offset from the base portion 30 and the lever 72 by an angle of forty-five degrees or any other angle.

Further, one or both of the first side portion 32 or the second side portion 34 may include a support structure 74 and/or one or more compression tabs 76. The support structure 74 may be a structure having a non-uniform thickness from the remaining portions of the first side portion 32 or the second side portion 34 and may be configured to prevent excessive bending of the side portions 32, 34. In some examples, the support structure 74 and may be integrally formed with each of the side portions 32, 34. The one or more compression tabs 76 may be positioned within and/or separate from the support structure 74 and be configured to contact the panel 20a, 20b that is positioned within the attachment member 26. In some instances, the compression tabs 76 provide for additional contact between the side portions 32, 34 of the attachment member 26 and the panel 20a, 20b, which may provide additional retention of the components in a fixed position relative to one another.

Figure 18:
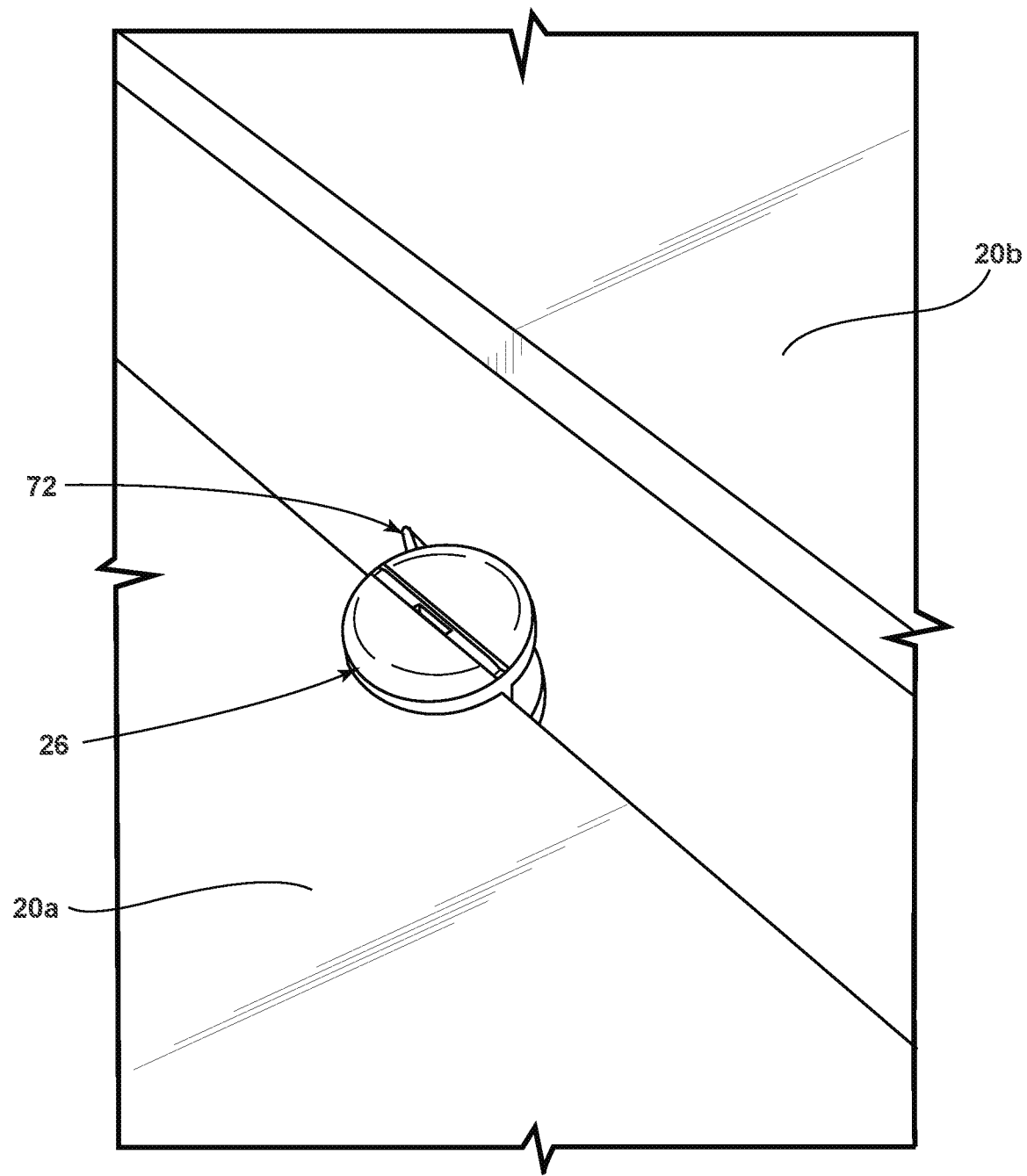
FIG. 18 is a top perspective view of the attachment member operably coupled with a first panel according to various aspects of the present disclosure.
Figure 19:
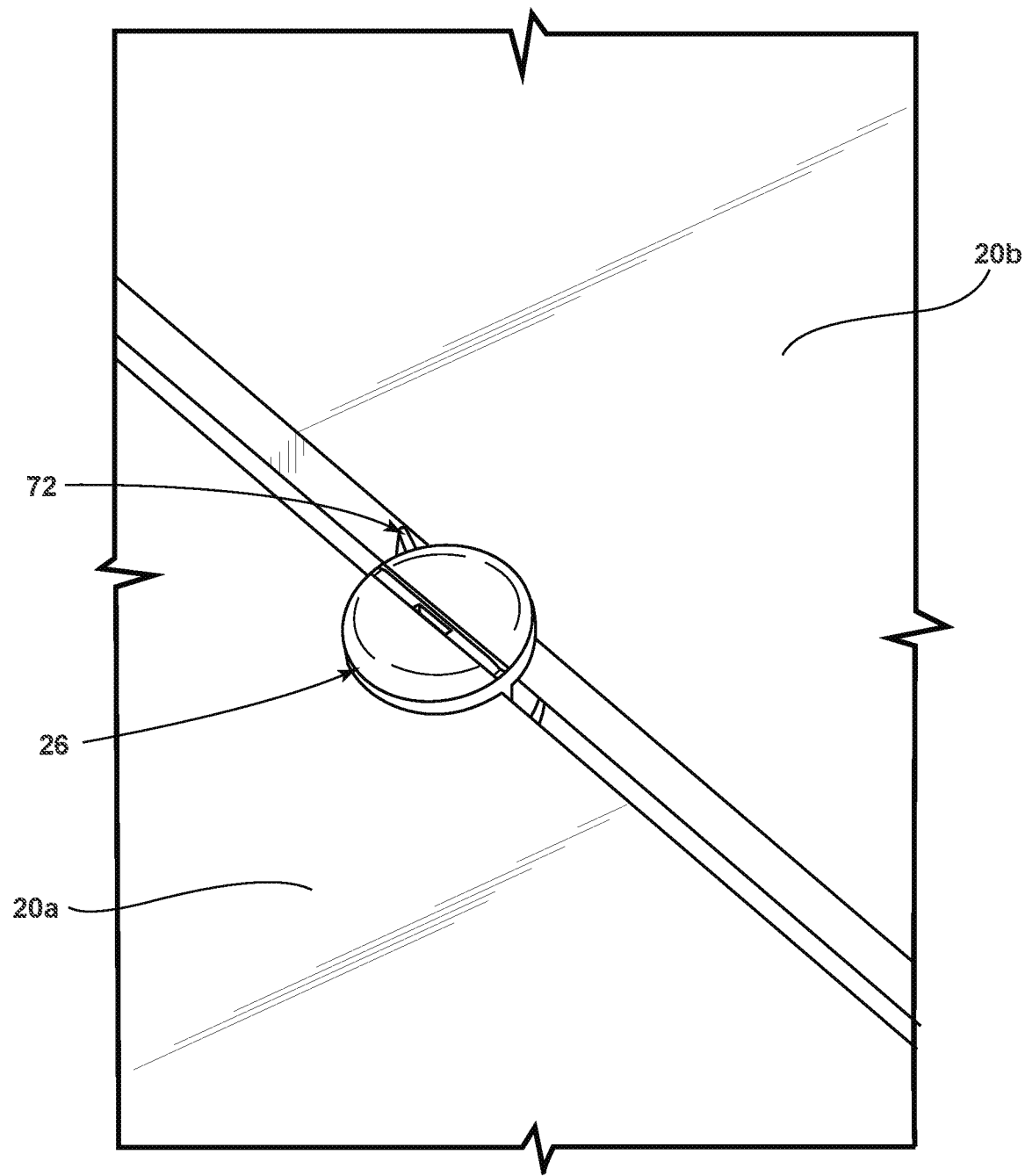
FIG. 19 is a top perspective view of the attachment member operably coupled with a first panel and having a second panel partially coupled with the attachment member according to various aspects of the present disclosure.
Figure 20:
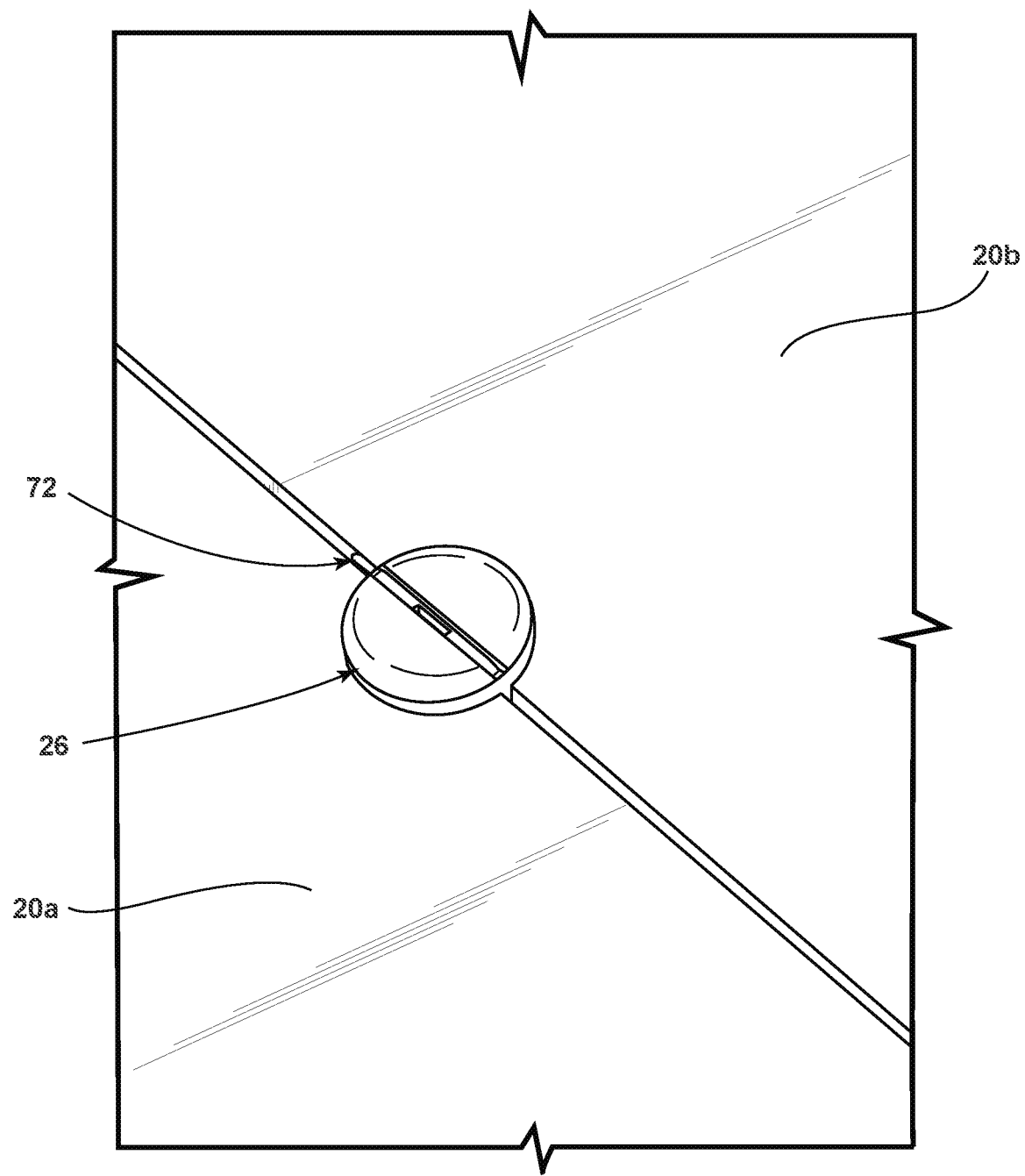
FIG. 20 is a top perspective view of the attachment member operably coupled with first and second panels according to various aspects of the present disclosure.

With reference to FIGS. 18-20, in various examples, the attachment member 26 may be positioned along an edge portion of a first panel 20a with the lever 72 at a non-parallel angle relative to the edge of the first panel 20a. As a second panel 20b is positioned between the first and second side portions 32, 34 on an opposing side of the base portion 30, the edge of the second panel 20b may contact the lever 72 and rotate the attachment member 26 as the second panel 20b is pressed further into the attachment member 26. The rotation of the attachment member 26 may cease when the base portion 30, and consequently, the lever 72, are positioned in a generally parallel orientation to the edges of the first and second panels 20a, 20b. As the attachment member 26 may be rotated into place, the first and second panels 20a, 20b may be correctly oriented within the attachment member 26 in less time while ensuring more accurate alignment.

Figure 21:
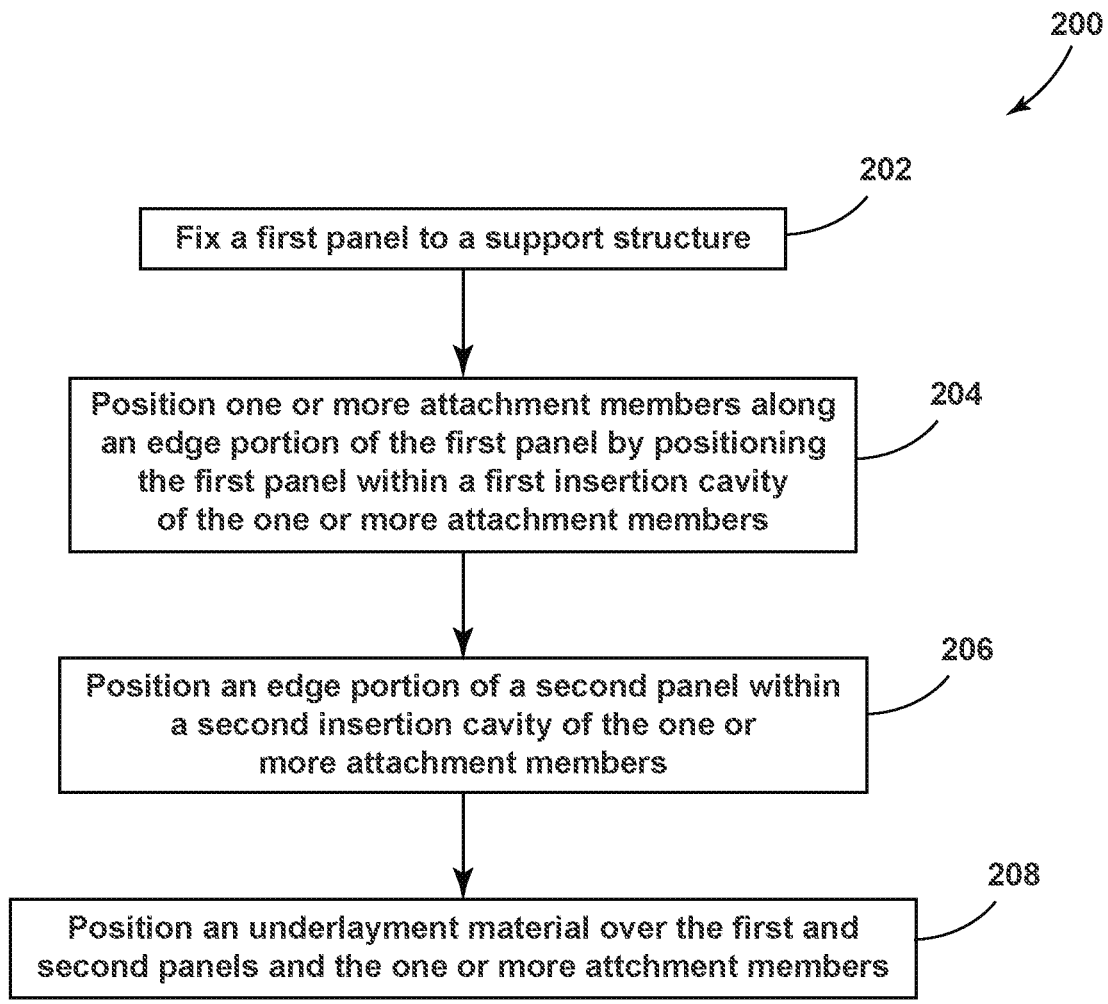
FIG. 21 is a method of using the attachment member according to various aspects of the present disclosure.

Referring now to FIG. 21, a flow diagram is provided of a method 200 for using the attachment member in accordance with various aspects of the present disclosure. The attachment member used by the method 200 may be configured in accordance with any of the various aspects that may be implemented within the attachment member described hereinabove and depicted in FIGS. 1 through 20. As such, in at least certain aspects, the attachment member operated by the method 200 may be incorporated into a roofing structure or any other structure that includes multiple panels.

For the example aspect depicted, the method 200 includes, at step 202, fixing a first panel along a support structure of a roof. As provided herein, the support structure can include various components, such as pillars, internal walls, and/or cross beams or trusses.

Next, at step 204, the method 200 includes positioning one or more attachment members along an edge portion of the first panel. In some instances, the attachment member can include first and second insertion cavities on opposing sides of a base portion. In such examples, the first panel may be positioned within the first insertion cavity. In some cases, the base portion may be positioned in an offset orientation relative to the edge portion of the first panel. However, in some cases, the base portion may be generally aligned with the edge portion of the first panel.

In addition, as provided herein, the base portion may form a lever that is positioned outwardly of at least one of the first and second side portions. The lever, in some instances, may have a chamfered end portion, a curved end portion, or an end portion of any other practicable shape. In some examples, the one or more attachment members are each positioned along an edge portion of the first panel with the lever at a non-parallel angle relative to the edge portion of the first panel.

Additionally or alternatively, in some instances, one or both of the side portions of the attachment member may include one or more features for further assisting an installer of the one or more panels. For instance, one or both of the side portions may include indicia thereon that indicates a predefined direction of orientation for the attachment member or a suggested initial position of the attachment member relative to an edge of the first panel. For example, one or both of the side portions may include an arrow that extends in an offset direction from the base portion and/or the lever. In such instances, the indicia may provide an alignment line that is offset from the base portion and the lever by an angle of forty-five degrees, or any other angle. As such, in some cases, positioning the one or more attachment members along the edge portion of the first panel may further comprise aligning the one or more attachment members with the first panel in an initial position by aligning the panel with the indicia.

Next, at step 206, the method 200 includes positioning an edge portion of a second panel that may be positioned within the second insertion cavity. As the edge portion is inserted into the second insertion cavity, the second panel may contact the base portion causing the attachment to rotate into an alignment position. Once the attachment member is aligned with the first panel, the second panel is fully inserted into the second insertion cavity such that the first and second panels may be offset by the defined width of the base portion of the attachment member.

In some cases, at least one of the first panel or the second panel may interact with one or more contact buttons that extend away from the top surface and/or the bottom surface from the base portion of one or more of the attachment members. For instance, the top surface of the base portion may include a plurality of contact buttons that allow for an edge of the first panel to contact each button. In some instances, the base portion may be formed with a standard thickness with the buttons having variable heights that allow for various offsets between the first and second panels.

Additionally or alternatively, in some examples, various arms, such as a first arm of the first side portion and the third arm of the second side portion may include extensions. In some examples, the extensions may be rounded or any other shape. In operation, the second arm 38, the fourth arm, and the extensions may define the second insertion cavity and align the second panel therein.

Lastly, at step 208, the method 200 includes positioning an underlayment material over the plurality of panels and the attachment members. As such, the side portions of the attachment members may be generally thin enough such that they are concealed and minimally apparent once the underlayment material is disposed thereover. For example, the side portions of the attachment member may have a thickness of less than 0.25 inches, less than 0.2 inches, less than 0.15 inches, and/or any other practicable thickness.

In various methods, more than one attachment member may be positioned along a common edge of the panel. For example, two or more attachment members may be positioned along a common edge of the first panel. As the second panel is inserted into each respective second insertion cavity, each of the attachment members may individually reposition itself relative to the first and second panels such that, upon full insertion of the second panel, each respective base portion is generally parallelly aligned with the edge portions of the first and the second panels.

Use of the present disclosure may offer a variety of advantages, which is provided by various combinations of the features provided herein. For instance, the attachment member provided herein may allow for a quicker and a more robust installation of multiple panels along a roof structure. The attachment member may allow for rotation during installation, which may occur due to the offset insertion of the panels relative to the attachment member and/or previously installed panels while additional panels are installed. Moreover, the effects of variances in roof pitched may be minimized through the use of the attachment member due to its self-alignment capabilities. The attachment member provided herein may be manufactured at lower costs compared to other attachment members that are only capable of a single installation process.

It will be understood by one having ordinary skill in the art that construction of the described invention and other components is not limited to any specific material. Other example examples of the invention disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

It is also important to note that the construction and arrangement of the elements of the invention as shown in the examples are illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other example examples without departing from the spirit of the present innovations.

It will be understood that any described processes or steps within described processes may be combined with other disclosed processes or steps to form structures within the scope of the present invention. The example structures and processes disclosed herein are for illustrative purposes and are not to be construed as limiting. In addition, variations and modifications can be made on the aforementioned structures and methods without departing from the concepts of the present invention and such concepts are intended to be covered by the following claims unless these claims by their language expressly state otherwise.

What is claimed is:

1. An attachment member, comprising:
   a base portion configured to be positioned between a first panel and a second panel; and
   a first side portion and a second side portion respectively positioned on opposing sides of the base portion, the first side portion defining first and second arms and the second side portion defining third and fourth arms, wherein each of the first arm, the second arm, the third arm, and the fourth arm define a non-linear boundary, wherein the first arm, the third arm, and the base portion, in combination, define a first insertion cavity, and
   wherein the first arm extends a different distance from the third arm in a Y-axis direction from a top surface of the base portion.

2. The attachment member of claim 1, wherein at least one of the first arm, the second arm, the third arm, and the fourth arm extend outward of the base portion in a Y-axis direction.

3. The attachment member of claim 1, wherein the second arm, the fourth arm, and the base portion, in combination, define a second insertion cavity, the second insertion cavity on an opposing side of the base portion from the first insertion cavity, and
 wherein the second arm extends a different distance from the fourth arm in a Y-axis direction from a top surface of the base portion.

4. The attachment member of claim 1, wherein the first arm extends a first distance from a top surface of the base portion and the second arm extends a second distance from a bottom surface of the base portion, the second distance greater than the first distance.

5. The attachment member of claim 4, wherein the second arm defines an aperture having a maximum aperture distance, and wherein the maximum aperture distance is greater than the first distance.

6. The attachment member of claim 1, wherein the first arm extends from the base portion at a non-perpendicular angle.

7. The attachment member of claim 1, wherein the base portion defines a first length and the first arm defines a second length, and wherein the first length is greater than the second length.

8. The attachment member of claim 1, wherein the first arm, the second arm, the third arm, and the fourth arm extend outward of the base portion in a Y-axis direction, and wherein the base portion extends beyond each of the first arm, the second arm, the third arm, and the fourth arm in a Z-axis direction.

9. The attachment member of claim 1, wherein the base portion forms a lever that extends outwardly of the first and second side portions in a Z-axis direction, and wherein the base portion is defined by a length in the Z-axis direction, a width in an X-axis direction, and a thickness in a Y-axis direction.

10. A method for installing panels, the method comprising:
 fixing a first panel to a support structure;
 positioning one or more attachment members along an edge portion of the first panel by positioning the first panel within a first insertion cavity of the one or more attachment members, wherein a base portion of the one or more attachment members is positioned in a first position with the base portion in a non-parallel orientation relative to the edge portion of the first panel; and
 positioning an edge portion of a second panel within a second insertion cavity of the one or more attachment members, wherein the edge portion of the second panel contacts the base portion of the one or more attachment members causing the one or more attachment members to rotate into a second position with the base portion of the one or more attachment members parallel to the edge portion of the first panel and the edge portion of the second panel.

11. The method of claim 10, further comprising:
 positioning an underlayment material over the first and second panels and the one or more attachment members.

12. The method of claim 10, wherein each of the one or more attachment members includes a first side portion and a second side portion respectively positioned on opposing sides of the base portion and a lever extending outwardly of the first and second side portions in a Z-axis direction, and wherein the base portion is defined by a length in the Z-axis direction, a width in an X-axis direction, and a thickness in a Y-axis direction.

13. The method of claim 12, wherein the one or more attachment members are each positioned along the edge portion of the first panel with the lever at a non-parallel angle relative to the edge portion of the first panel.

14. The method of claim 10, wherein at least one of the first panel or the second panel may interact with one or more contact buttons that extend away from a top surface or a bottom surface of the base portion of one or more of the attachment members.

15. The method of claim 10, wherein positioning the one or more attachment members along the edge portion of the first panel further comprises aligning the one or more attachment members with the first panel in an initial position by aligning the panel with an indicia.

16. An attachment member, comprising:
 a base portion configured to be positioned between a first panel and a second panel, wherein the base portion is defined by a length in a Z-axis direction, a width in an X-axis direction, and a thickness in a Y-axis direction; and
 a first side portion and a second side portion respectively positioned on opposing sides of the base portion, the first side portion defining first and second arms and the second side portion defining third and fourth arms;
 wherein the first arm, the third arm, and the base portion, in combination, define a first insertion cavity and the second arm, the fourth arm, and the base portion, in combination, define a second insertion cavity, the second insertion cavity on an opposing side of the base portion from the first insertion cavity, and
 wherein the first arm extends a different distance from the third arm in a Y-axis direction from a top surface of the base portion and the second arm extends a different distance from the fourth arm in a Y-axis direction from a top surface of the base portion.

17. The attachment member of claim 16, further comprising:
 a lever extending outwardly of the first and second side portions in the Z-axis direction; and
 one or more contact buttons positioned along a surface of the base portion, wherein the contact buttons are separated from the first and second side portions by the base portion.

18. The attachment member of claim 16, wherein at least one of the first side portion or the second side portion defines a support structure, the support structure having a non-uniform thickness from remaining portions of the first side portion or the second side portion.

19. The attachment member of claim 18, further comprising:
 an indicia integrated within the support structure and configured to indicate a predefined direction of orientation for the attachment member.

20. The attachment member of claim 19, wherein the indicia provides an alignment line that is offset from a lever extending outwardly of the first and second side portions in the Z-axis direction.

* * * * *